United States Patent
Schreiber

(10) Patent No.: US 8,581,601 B2
(45) Date of Patent: Nov. 12, 2013

(54) ROTATION ANGLE SENSOR OR LENGTH SENSOR

(75) Inventor: Michael Schreiber, Pressath (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1079 days.

(21) Appl. No.: 12/531,943

(22) PCT Filed: Mar. 28, 2008

(86) PCT No.: PCT/EP2008/053736
§ 371 (c)(1),
(2), (4) Date: Sep. 18, 2009

(87) PCT Pub. No.: WO2008/119758
PCT Pub. Date: Oct. 9, 2008

(65) Prior Publication Data
US 2010/0102827 A1    Apr. 29, 2010

(30) Foreign Application Priority Data
Mar. 29, 2007   (DE) .......................... 10 2007 015 195

(51) Int. Cl.
*G01R 27/04* (2006.01)
*G01R 27/00* (2006.01)

(52) U.S. Cl.
USPC ............................. 324/637; 324/600; 324/705

(58) Field of Classification Search
None
See application file for complete search history.

(56) References Cited

U.S. PATENT DOCUMENTS

| 3,749,999 | A | 7/1973 | Kliphuis | |
| 4,862,061 | A | 8/1989 | Damon | |
| 6,255,810 | B1 | 7/2001 | Irle et al. | |
| 6,522,128 | B1 | 2/2003 | Ely et al. | |
| 7,313,467 | B2 * | 12/2007 | Breed et al. | 701/1 |
| 7,444,210 | B2 * | 10/2008 | Breed et al. | 701/1 |
| 2009/0224500 | A1 * | 9/2009 | Raschke et al. | 280/93.5 |
| 2009/0314104 | A1 * | 12/2009 | Lohr et al. | 73/862.338 |

FOREIGN PATENT DOCUMENTS

| DE | 256 628 A3 | 5/1988 |
| DE | 42 13 866 A1 | 10/1992 |
| DE | 43 17 512 A1 | 12/1994 |
| DE | 690 13 170 T2 | 5/1995 |
| DE | 197 38 841 A1 | 3/1999 |
| DE | 698 10 504 T2 | 11/2003 |
| DE | 103 09 027 A1 | 9/2004 |
| EP | 0 378 179 A2 | 7/1990 |
| EP | 0 605 847 A1 | 7/1994 |

* cited by examiner

*Primary Examiner* — Jermele M Hollington
*Assistant Examiner* — Trung Nguyen
(74) *Attorney, Agent, or Firm* — Davis & Bujold, PLLC; Michael J. Bujold

(57) ABSTRACT

A rotation angle sensor with two or more oscillators which comprises, in each case, striplines fixed on a dielectric support, as sensor elements, such that the oscillators are arrayed in a curve, for angle measurement, or they are arrayed in a straight line, for position measurement. One or more actuating elements, for example eddy-current actuating elements, are passed over the curve or the line to cause relative movement. The striplines are shaped so that the one or more actuating elements (B1, B2) cover more than one oscillator.

16 Claims, 4 Drawing Sheets

ROTATION ANGLE SENSOR OR LENGTH SENSOR

This application is a National Stage completion of PCT/EP2008/053736 filed Mar. 28, 2008, which claims priority from German patent application serial no. 10 2007 015 195.2 filed Mar. 29, 2007.

FIELD OF THE INVENTION

The invention relates to a rotation angle sensor with two or more oscillators according to Claim 1, and to a length sensor with two or more.

BACKGROUND OF THE INVENTION

From the prior art as described in DE 690 13 170 T2 a proximity sensor is known, which works with so-termed striplines. Striplines are a particular class of electric waveguides which consist of one or more conductive strips fixed on a dielectric support. Stripline structures can consist for example of conductive strips arranged in one plane. They are often arranged, insulated, in or on a metallic surface. Their field of use is in high-frequency technology and, in that context, within the microwave range. They provide defined impedances in circuits for the transmission, coupling and filtering of high signal frequencies.

Often they are referred to using the English term 'stripline' and in many cases also the English term 'microstrip', although the latter denotes a particular structural form. In any event striplines are only conducting paths on printed circuits (printed-circuit boards) which are of a size to act as waveguides, and are operated as such. The electric and magnetic fields extend almost exclusively perpendicularly to the propagation direction, as is also the case in coaxial, or two-wire leads. In contrast, however, striplines are only used for short distances within structural groups.

The proximity sensor according to the document DE 690 13 170 T2 makes use of this technology. A proximity sensor is disclosed, which has just one oscillator and just one actuating element, not a rotation angle sensor or a length sensor with two or more oscillators. Correspondingly, in this prior art only the distance of this actuating element from the oscillator is evaluated, but not anything such as a relative movement of a plurality of oscillators around a curve or along a line. The known stripline is either linear (FIGS. 5/6) or of spiral shape (FIGS. 7/8). The purpose of the present invention is to put to use the technology of the known proximity switch for rotation angle sensors and length sensors.

SUMMARY OF THE INVENTION

The solution, which includes the aforesaid technical prerequisite (a plurality of oscillators), consists in shaping the striplines of the sensor elements in such manner that an actuating element covers more than one oscillator, or a plurality of actuating elements cover more than one oscillator.

In particular, the assembly of striplines can be nested in a curve one inside another; if the associated actuating element has the shape of a slender rod, then in any position it covers two to three sensor elements. Analogously, the configuration of the striplines can also be straight whereas the actuating element is curved in a sickle shape, or is orientated obliquely. Then too, in any measurement position two or three sensor elements will be covered. A comparable effect is achieved when two mechanically coupled actuating elements cover more than one oscillator.

BRIEF DESCRIPTION OF THE DRAWINGS

Other features and advantages of the invention emerge from the following description of figures, which show.

DETAILED DESCRIPTION OF THE PREFERRED EMBODIMENTS

Figure 1:
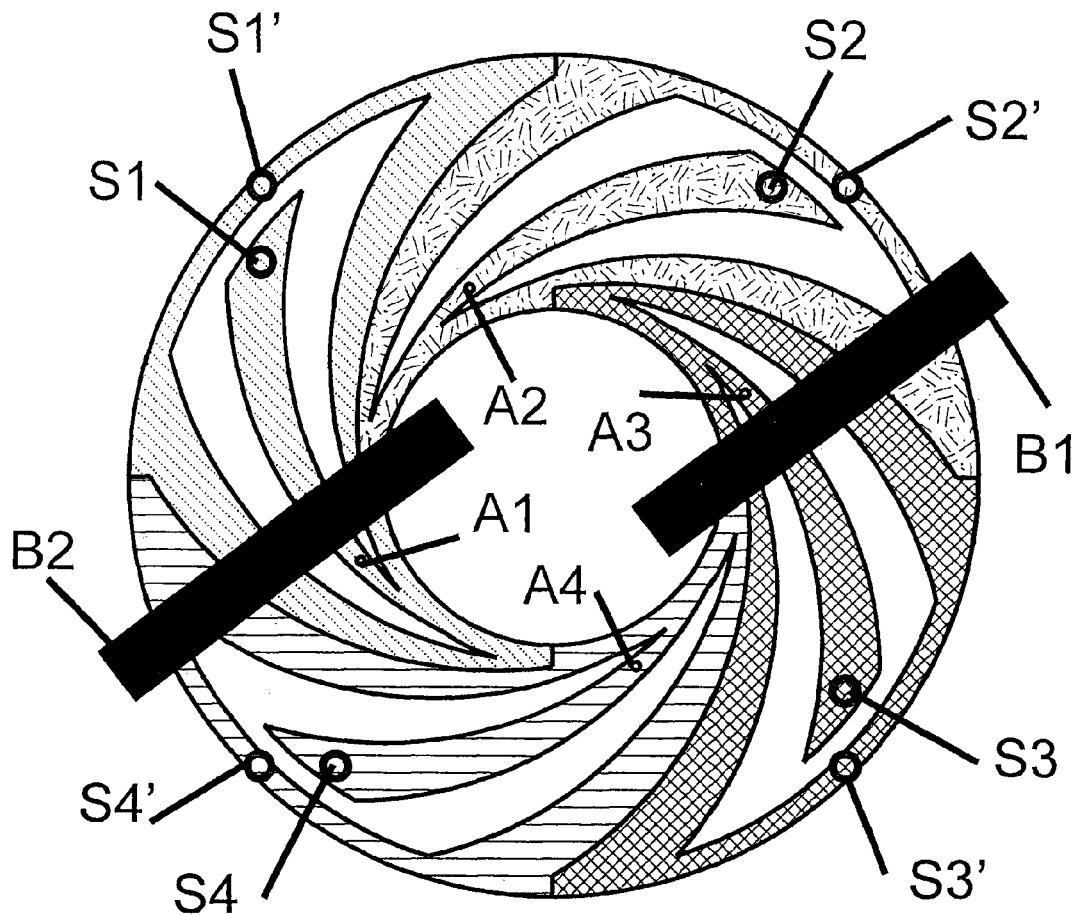
FIG. 1: An example embodiment of a rotation angle sensor with four curved stripline structures nested one inside another and with two straight actuating elements positioned approximately radially
Figure 2:
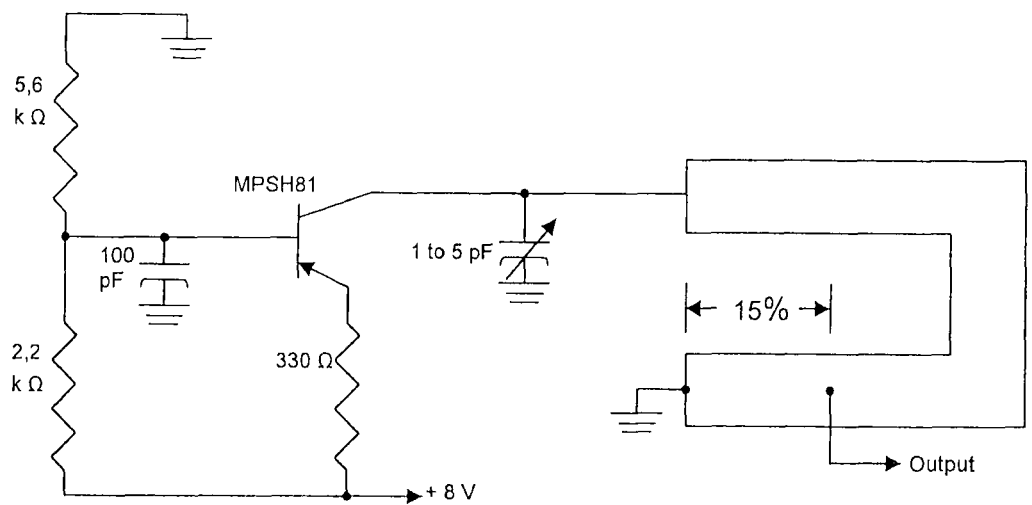
FIG. 2: Circuit diagram of a known stripline (microstrip) having three connection terminals, and whose frequency range can be tuned with the help of a capacitor

In the example embodiment shown in FIG. 1 exact rotation angles (or, in other arrangements, also a torque) are determined with no contact by stripline oscillators arranged in a circle. This can begin, for example, from the U-shaped stripline oscillator shown in FIG. 2 or from the linear structure or from the spiral structure according to the DE 690 13 170 T2 prior art. The stripline is usually made by removing (by etching or milling) the top layer of metallization on the support. To measure a rotation angle larger than 360 degrees using the known oscillator geometries, a plurality of such microstrips must be arranged in a circle. However, if no special provisions are made, the disadvantage exists that the desired rotation angle measurement cannot be continuously made with constantly high accuracy. In contrast, with the solution shown in FIG. 1 not only can the rotation angle be measured dynamically with high angular resolution, but it is also possible, with relatively little additional effort and expense, to determine a torque. The no-contact determination of the rotation angle takes place by virtue of the oscillators, which oscillate at high frequencies (GHz range), with an angular resolution of 0.01 degree over a radius of a few centimeters.

Starting from the prior art cited, the shape of the known striplines is changed to give circular segments and in a certain sense—namely in relation to the actuating element—they are arranged with an overlap. In FIG. 1 four individual striplines can be seen, identifiable by their black outlines; however, different numbers of striplines can also be used. The striplines can be electrically separate from one another; however, they can also consist of a copper surface (high-frequency principle). With both variants the function would remain the same; only the frequencies would change.

In FIG. 1 actuation is effected for example by a metal rod, which is passed over the oscillators. On each respective stripline the indexes S1 to S4 denote the corresponding connection point for the oscillator circuit. To save space, the connection points S1 to S4 can also be arranged on the back of the circuit board. Furthermore, the oscillator signal decoupling points are indexed A1 to A4. Corresponding to the overlapping, twisted configuration shown in FIG. 1, the striplines can also be twisted in the opposite direction or they can be arranged in mirror-image inversion. In such a case the connection points S1 to S4 for the oscillator circuit and the decoupling points A1 to A4 of the oscillator signals then have to be adapted accordingly.

FIG. 1 shows the sense in which the above-described overlapping is to be understood. The striplines are shaped so that an actuating element (or even a plurality of actuating elements) always cover(s) more than one oscillator. Thanks to this overlap, uninterruptedly continuous detection of the position is possible. In theory, with only two coils an entire revolution can be detected without any break. If, in addition to rotation angle determination, it is also desired to determine a torque, then the number of oscillators can be increased correspondingly.

As the damping elements B1 and B2 of the striplines, various materials and geometries can be used (for example small metal plates, ferrite, etc.); however, it is preferable to use a metal rod.

Owing to the high frequencies of the oscillators, despite the short measurement time very high dynamics are achieved. To facilitate the evaluation of the signal, a frequency shift (for example by a multiplier) to a lower frequency range is recommended. The signals, which are measured with no contact, can then be evaluated for example with the help of digital technology.

By uniform distribution of the temperature, the invention favors the compensation of temperature variations over time, i.e. a fluctuation compensation which takes place during the digital evaluation. Thus, the sensor array shown in FIG. 1 contributes toward a temperature-stable system. A further advantage worth mentioning is that the electromagnetic tolerance (EMT) is substantially less critical than with known rotation angle sensors, since owing to the high frequencies screening is easier and by means of an evaluation step of integration (by virtue of the frequency measurement method) interferences are averaged out. By comparison with known rotation angle sensors, there is also a saving of active components.

Figure 3:
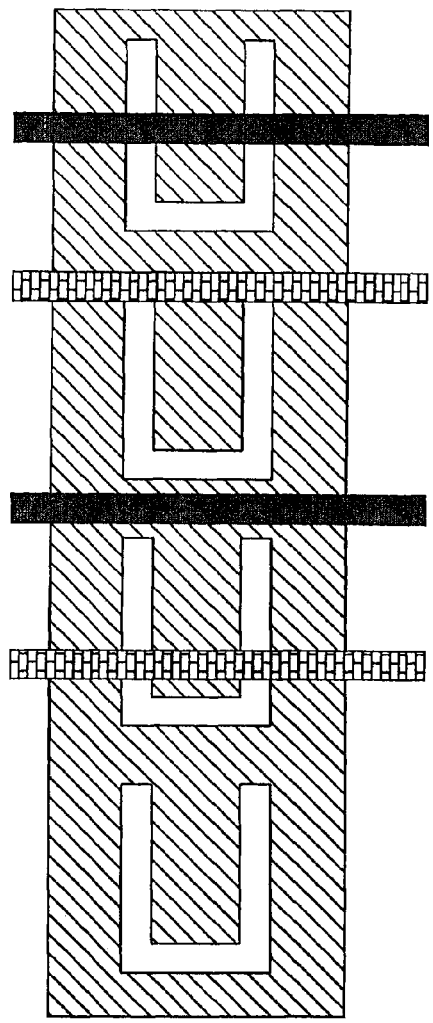
FIG. 3: A linear, overlapping array of striplines, overlapping in relation to a straight actuating element

FIG. 3 shows a linear array of striplines, which can be thought of as a straightening out of the curved array shown in FIG. 1. Accordingly, this is a length sensor which determines the position of the straight actuating element. In the measurement range of the arrangement, the actuating element—owing to the "overlapping", oblique configuration of the striplines—covers more than one oscillating stripline. In other respects the explanations relate to those for FIGS. 1 and 2.

Figure 5:
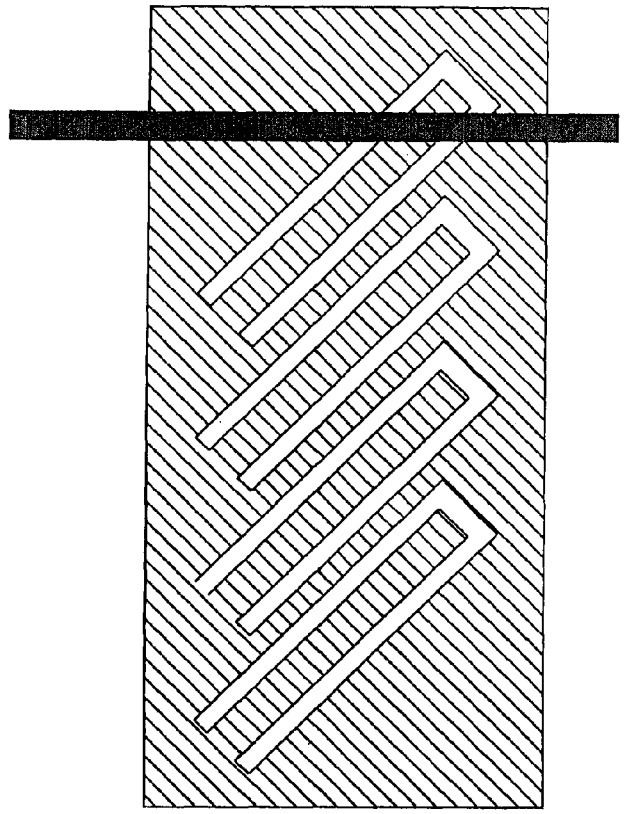
FIG. 5: A straight (linear) array of striplines, with two coupled actuating elements according to the invention
Figure 4:
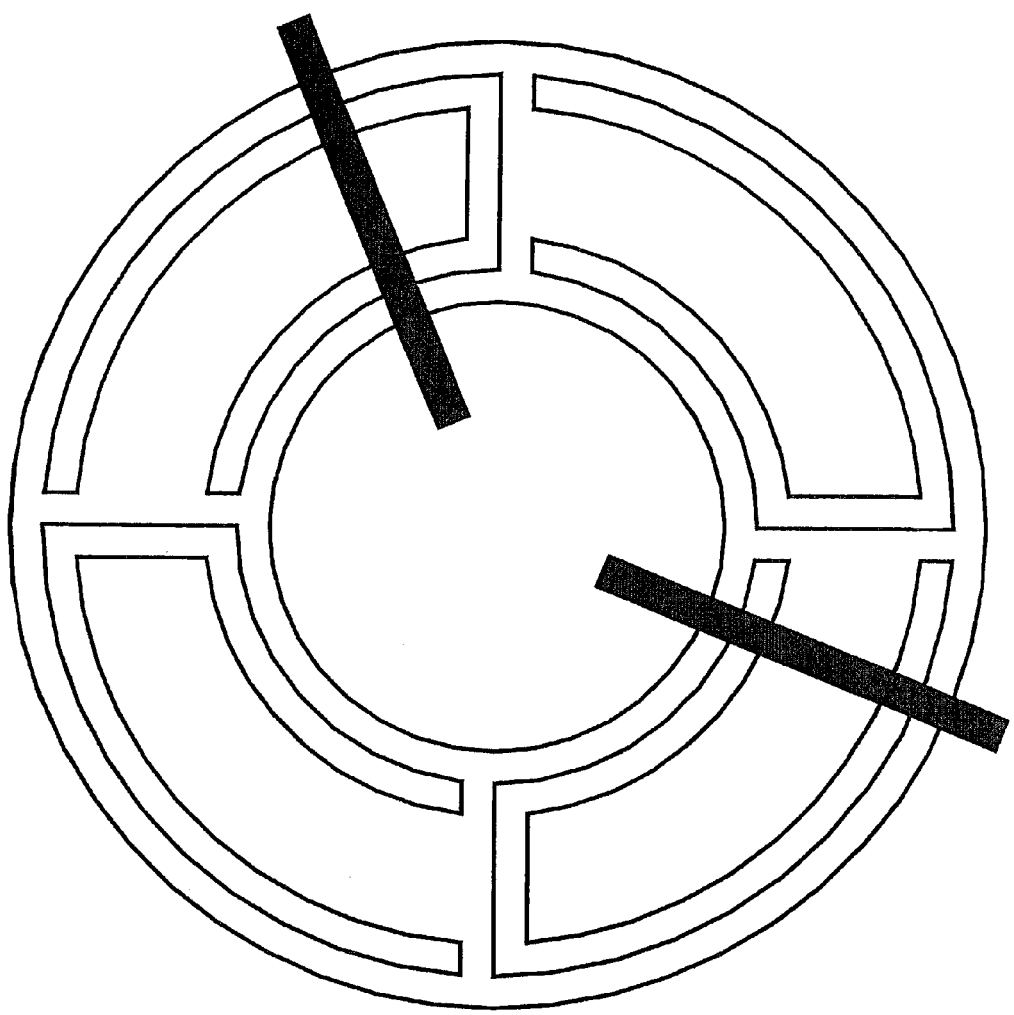
FIG. 4: Circular-arc-shaped array of striplines, with two coupled actuating elements according to the invention.

FIGS. 4 and 5 show arrangements (again, curved for angle measurement and straight for length measurement, respectively), which differ from the corresponding structures shown in FIGS. 1 and 3 in that the overlap is produced in other ways. In the configurations of FIGS. 4 and 5 the stripline oscillators are not sickle-shaped and nested obliquely one in another in relation to a radial or transverse actuating element. Rather, two radial actuating elements (FIG. 4) or two transverse actuating elements are mechanically coupled to one another. Either the two actuating elements are on a common support, or two individually supported actuating elements are used, which always move with a predetermined, fixed distance between them. With such an arrangement too, the principle according to the invention is realized since at every point within the measurement range more than one stripline oscillator is covered.

The invention claimed is:

1. A rotation angle sensor having at least two stripline oscillators, which comprises respective striplines as sensor elements of a type in a form of so-termed microstrips fixed to a dielectric support such that the stripline oscillators are arrayed in a curve, for angle measurement, such that at least one actuating element is passed by relative movement over the curved array, and the striplines in the form of so-termed microstrips are of such a shape that the at least one actuating element covers more than one of the stripline oscillators.

2. The rotation angle sensor according to claim 1, wherein the striplines are positioned obliquely to a direction of the relative movement.

3. The rotation angle sensor according to claim 2, wherein the striplines are curved.

4. The rotation angle sensor according to claim 3, wherein the striplines are nested inside one another in a curve.

5. The rotation angle sensor according to claim 1, wherein the actuating element is a straight metal rod.

6. The rotation angle sensor according to claim 1, wherein two actuating elements are two straight metal rods mechanically coupled to one another.

7. The rotation angle sensor according to claim 1, wherein two rotation sensors, separated by an axial distance, are utilized as a torque sensor.

8. A length sensor having at least two stripline oscillators, which comprises respective striplines as sensor elements of a type in the form of so-termed microstrips fixed on a dielectric support, such that for linear measurement the stripline oscillators are arrayed in a line, such that at least one actuating element is passed with relative movement over the linear array, and the striplines in the form of so-termed microstrips are of such shape that the at least one actuating element (B1, B2) covers more than one stripline oscillator.

9. The length sensor according to claim 8, wherein the striplines, in the form of so-termed microstrips, are positioned obliquely to a direction of the relative movement.

10. The length sensor according to claim 8, wherein the striplines in the form of so-termed microstrips are curved.

11. The length sensor according to claim 10, wherein the striplines in the form of so-termed microstrips are nested inside one another in a curve.

12. The length sensor according to claim 8, wherein the actuating element is a straight metal rod.

13. The length sensor according to claim 8, wherein two actuating elements are two straight metal rods mechanically coupled to one another.

14. The length sensor according to claim 8, wherein two length sensors, separated by a distance, measure a position difference.

15. The rotation angle sensor according to claim 1, wherein rotation angle sensor comprises four striplines in the form of so-termed microstrips.

16. The length sensor according to claim 8, wherein the length sensor comprises four striplines in the form of so-termed microstrips.

* * * * *